US012776581B2

(12) United States Patent
Hassan

(10) Patent No.: US 12,776,581 B2
(45) Date of Patent: Oct. 27, 2026

(54) APPARATUS AND METHODS FOR DIELECTRIC RESONATOR ANTENNAS

(71) Applicant: Analog Devices International Unlimited Company, Limerick (IE)

(72) Inventor: Mohamed Hassan, Al Jizah (EG)

(73) Assignee: ANALOG DEVICES INTERNATIONAL UNLIMITED COMPANY, Limerick (IE)

(*) Notice: Subject to any disclaimer, the term of this patent is extended or adjusted under 35 U.S.C. 154(b) by 389 days.

(21) Appl. No.: 18/302,211

(22) Filed: Apr. 18, 2023

(65) Prior Publication Data

US 2024/0356231 A1 Oct. 24, 2024

(51) Int. Cl.
*H01Q 9/04* (2006.01)
*H01Q 1/48* (2006.01)
*H01Q 21/06* (2006.01)

(52) U.S. Cl.
CPC ............. *H01Q 9/0485* (2013.01); *H01Q 1/48* (2013.01); *H01Q 21/061* (2013.01)

(58) Field of Classification Search
CPC ....... H01Q 9/0485; H01Q 1/48; H01Q 21/061
See application file for complete search history.

(56) References Cited

U.S. PATENT DOCUMENTS 6,452,565 B1* 9/2002 Kingsley .............. H01Q 9/0492 343/873
2008/0129616 A1* 6/2008 Li ........................ H01Q 9/0485 343/873
2008/0278378 A1* 11/2008 Chang ...................... H01Q 1/38 343/700 MS
2011/0025571 A1* 2/2011 Adada ...................... H01Q 1/38 343/770
2015/0188239 A1* 7/2015 Tong ...................... H01Q 1/243 343/720

(Continued)

FOREIGN PATENT DOCUMENTS

CN 106602267 A * 4/2017 ............... H01Q 5/10
CN 108390153 A * 8/2018 ............. H01Q 13/08

(Continued)

OTHER PUBLICATIONS

Kishk et al., "Study of the Shaped Probe on the Cup Dielectric Resonator Antenna for Bandwidth Enhancement" downloaded May 4, 2023 from IEEE Xplore in 4 pages.

(Continued)

*Primary Examiner* — Alexander H Taningco
(74) *Attorney, Agent, or Firm* — Knobbe, Martens, Olson & Bear, LLP

(57) ABSTRACT

Apparatus and methods for dielectric resonator antennas are disclosed herein. In certain embodiments, a dielectric resonator antenna includes a dielectric body, one or more signal conductors formed in the dielectric body and configured to handle a radio frequency wave, and one or more signal ports on an outer surface of the dielectric body and connected to the one or more signal conductors. The dielectric resonator antenna is mountable to a circuit board (for instance, to a PCB), with the one or more signal ports serving as an interface between the dielectric resonator antenna and the circuit board. Such an interface can further include one or more ground ports.

20 Claims, 10 Drawing Sheets

(56) References Cited

U.S. PATENT DOCUMENTS

| | | | | |
|---|---|---|---|---|
| 2015/0207235 A1* | 7/2015 | Lee | H01Q 21/24 343/767 |
| 2018/0159237 A1* | 6/2018 | Crouch | H01Q 13/085 |
| 2020/0028231 A1* | 1/2020 | Leung | H01Q 1/38 |
| 2020/0083610 A1* | 3/2020 | Pance | H01Q 15/08 |
| 2022/0181052 A1* | 6/2022 | Williams | H01F 1/0315 |
| 2024/0039164 A1* | 2/2024 | Wu | H01Q 5/25 |

FOREIGN PATENT DOCUMENTS

| | | | | |
|---|---|---|---|---|
| JP | 2004312287 A * | 11/2004 | |
| WO | WO-0115261 A1 * | 3/2001 | H01P 1/2086 |
| WO | WO-2018107478 A1 * | 6/2018 | H01P 7/10 |

OTHER PUBLICATIONS

Li, et al., "A DRA With Engraved Groove and Comb-Like Metal Wall for Beamwidth Enhancement in Both E- and H-Planes" IEEE Antennas and Wireless Propagation Letters, vol. 20, No. 4, Apr. 2021 in 5 pages.

Pramiti et al., "Geometry Perturbation of Dielectric Resonator for Same Frequency Operation as Radiator and Filter" downloaded May 4, 2023 from IEEE Xplore in 3 pages.

Su, et al., "A Shaped-Beam Antenna for Wide-Angle Scanning Phased Array" IEEE Transactions on Antennas and Propagation, vol. 70, No. 9, Sep. 2022 in 11 pages.

Tong, et al., "Compact Wideband Circularly Polarized Dielectric Resonator Antenna With Dielectric Vias" IEEE Antennas and Wireless Propagation Letters, vol. 21, No. 6, Jun. 2022 in 5 pages.

Xia et al., "3-D-Printed Wideband Circularly Polarized Dielectric Resonator Antenna With Two Printing Materials" IEEE Transactions on Antennas and Propagation, vol. 70, No. 7, Jul. 2022 in 6 pages.

Xia et al., "3-D-Printed Wideband High-Efficiency Dual-Frequency Antenna for Vehicular Communications" IEEE Transactions on Vehicular Technology, vol. 71, No. 4, Apr. 2022 in 13 pages.

* cited by examiner

SMT ANTENNA ARRAY ON PCB

APPARATUS AND METHODS FOR DIELECTRIC RESONATOR ANTENNAS

FIELD OF THE DISCLOSURE

Embodiments of the invention relate to electronic systems, and more particularly, to antennas for radio frequency (RF) communications.

BACKGROUND

Antennas can be used in a wide variety of applications to transmit and/or receive radio frequency (RF) signals. Such applications include radar, satellite, military, and/or cellular communications. For instance, examples of RF communication systems with one or more antenna include, but are not limited to, base stations, mobile devices (for instance, smartphones or handsets), laptop computers, tablets, Internet of Things (IoT) devices, radar equipment, smart-vehicles, and/or wearable electronics.

SUMMARY OF THE DISCLOSURE

Apparatus and methods for dielectric resonator antennas are disclosed herein. In certain embodiments, a dielectric resonator antenna includes a dielectric body, one or more signal conductors formed in the dielectric body and configured to handle a radio frequency wave, and one or more signal ports on an outer surface of the dielectric body and connected to the one or more signal conductors. The dielectric resonator antenna is mountable to a circuit board (for instance, to a PCB), with the one or more signal ports serving as an interface between the dielectric resonator antenna and the circuit board. Such an interface can further include one or more ground ports. By implementing an antenna array using dielectric resonator antennas in accordance with the teachings herein, a compact antenna array can be achieved. For example, the dielectric resonator antennas herein can be arrayed with small pitch due to the dielectric resonator antennas extending vertically to provide for sufficient array spacing. The dielectric resonator antennas herein are mountable (for example, solderable) onto a circuit board as SMT components.

In one aspect, a dielectric resonator antenna includes a dielectric body having an outer surface configured to attach to a circuit board, a first signal conductor formed in the dielectric body and configured to handle a radio frequency wave, and a first signal port on the outer surface of the dielectric body and electrically connected to the first signal conductor.

In another aspect, an electronic system includes a circuit board and a first dielectric resonator antenna. The first dielectric resonator antenna includes a dielectric body having an outer surface attached to the circuit board, a first signal conductor formed in the dielectric body and configured to handle a radio frequency wave, and a first signal port on the outer surface of the dielectric body and electrically connected to the first signal conductor.

In another aspect, a dielectric resonator antenna includes a dielectric body having an outer surface configured to attach to a circuit board, a ground pad formed on the outer surface, and an excitation slot opening in the ground pad and configured to handle a radio frequency wave.

In another aspect, a method of making a dielectric resonator antenna is disclosed. The method includes forming a dielectric body having an outer surface configured to attach to a circuit board, forming a first signal conductor in the dielectric body and configured to handle a radio frequency wave, and forming a first signal port on the outer surface of the dielectric body and electrically connected to the first signal conductor.

In another aspect, a method of making a dielectric resonator antenna is disclosed. The method includes forming a dielectric body having an outer surface configured to attach to a circuit board, a ground pad formed on the outer surface, and an excitation slot opening in the ground pad and configured to handle a radio frequency wave.

DETAILED DESCRIPTION OF EMBODIMENTS

The following detailed description of embodiments presents various descriptions of specific embodiments of the invention. However, the invention can be embodied in a multitude of different ways. In this description, reference is made to the drawings. It will be understood that elements illustrated in the figures are not necessarily drawn to scale.

Moreover, it will be understood that certain embodiments can include more elements than illustrated in a drawing and/or a subset of the elements illustrated in a drawing. Further, some embodiments can incorporate any suitable combination of features from two or more drawings.

Example Phased Array Antenna Systems and RF Front Ends for Beamforming

Figure 1:
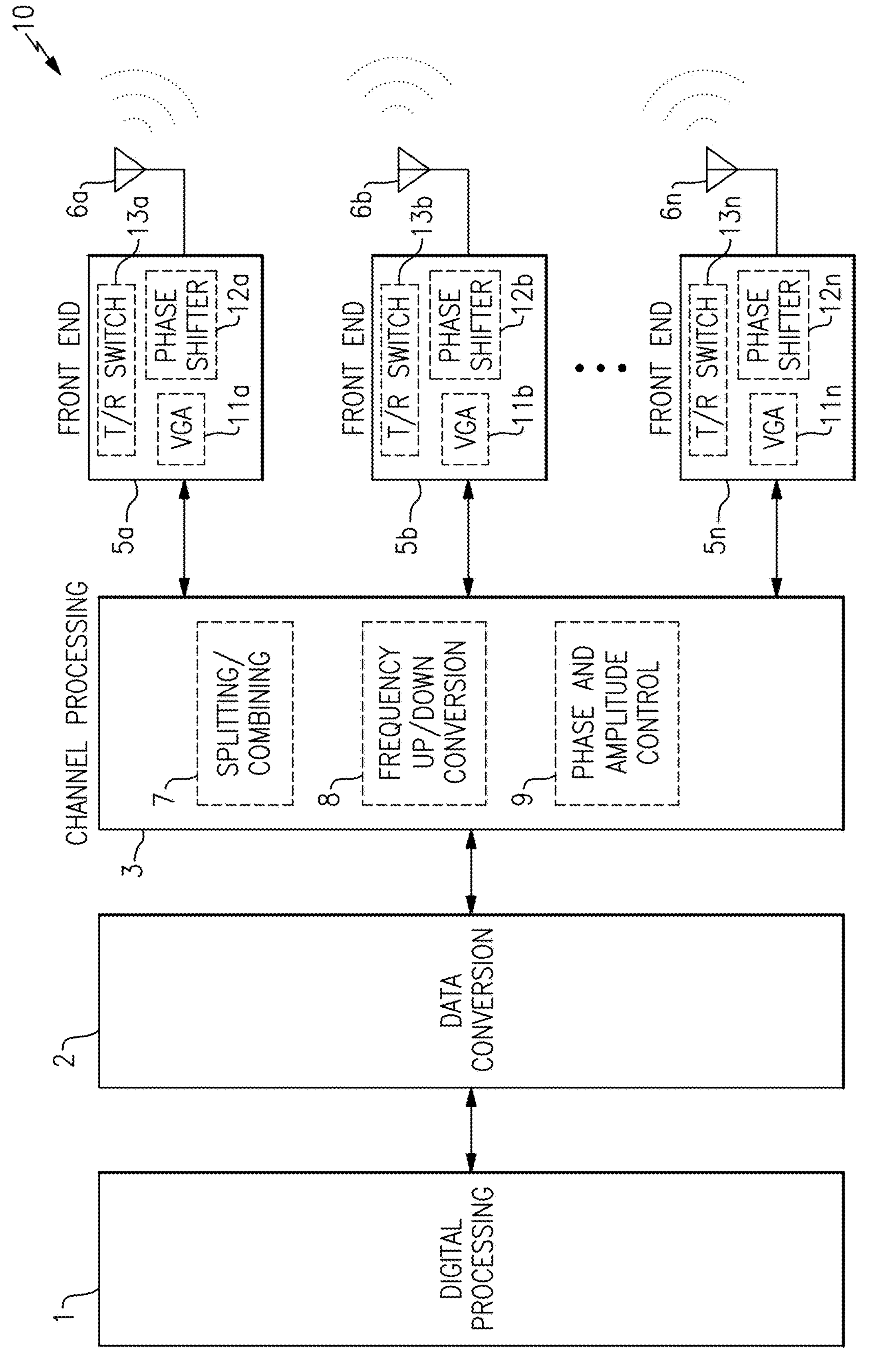
FIG. 1 is a schematic diagram of one embodiment of a phased array antenna system.

FIG. 1 is a schematic diagram of one embodiment of a phased array antenna system 10. The phased array antenna system 10 includes a digital processing circuit 1, a data conversion circuit 2, a channel processing circuit 3, RF front ends 5*a*, 5*b*, . . . 5*n*, and antennas 6*a*, 6*b*, . . . 6*n*. Although an example system with three RF front ends and three antennas is illustrated, the phased array antenna system 10 can include more or fewer RF front ends and/or more or fewer antennas as indicated by the ellipses. Furthermore, in certain implementations, the phased array antenna system 10 is implemented with separate antennas for transmitting and receiving signals.

The phased array antenna system 10 illustrates one embodiment of an electronic system that can include one or more dielectric resonator antennas implemented in accordance with the teachings herein. However, the dielectric resonator antennas disclosed herein can be used in a wide range of electronics. A phased array antenna system is also referred to herein as an active scanned electronically steered array or beamforming communication system.

As shown in FIG. 1, the channel processing circuit 3 is coupled to antennas 6*a*, 6*b*, . . . 6*n* through RF front ends 5*a*, 5*b*, . . . 5*n*, respectively. The channel processing circuit 3 includes a splitting/combining circuit 7, a frequency up/down conversion circuit 8, and a phase and amplitude control circuit 9, in this embodiment. The channel processing circuit 3 provides RF signal processing of RF signals transmitted by and received from each communication channel. In the illustrated embodiment, each communication channel is associated with a corresponding RF front end and antenna.

With continuing reference to FIG. 1, the digital processing circuit 1 generates digital transmit data for controlling a transmit beam radiated from the antennas 6*a*, 6*b*, . . . 6*n*. The digital processing circuit 1 also processes digital receive data representing a receive beam. In certain implementations, the digital processing circuit 1 includes one or more baseband processors.

As shown in FIG. 1, the digital processing circuit 1 is coupled to the data conversion circuit 2, which includes digital-to-analog converter (DAC) circuitry for converting digital transmit data to one or more baseband transmit signals and analog-to-digital converter (ADC) circuitry for converting one or more baseband receive signals to digital receive data.

The frequency up/down conversion circuit 8 provides frequency upshifting from baseband to RF and frequency downshifting from RF to baseband, in this embodiment. However, other implementations are possible, such as configurations in which the phased array antenna system 10 operates in part at an intermediate frequency (IF) or in which direct data conversion is provided between baseband and RF. In certain implementations, the splitting/combining circuit 7 provides splitting to one or more frequency upshifted transmit signals to generate RF signals suitable for processing by the RF front ends 5*a*, 5*b*, . . . 5*n* and subsequent transmission on the antennas 6*a*, 6*b*, . . . 6*n*. Additionally, the splitting/combining circuit 7 combines RF signals received vias the antennas 6*a*, 6*b*, . . . 6*n* and RF front ends 5*a*, 5*b*, . . . 5*n* to generate one or more baseband receive signals for the data conversion circuit 2.

The channel processing circuit 3 also includes the phase and amplitude control circuit 9 for controlling beamforming operations. For example, the phase and amplitude control circuit 9 controls the amplitudes and phases of RF signals transmitted or received via the antennas 6*a*, 6*b*, . . . 6*n* to provide beamforming. With respect to signal transmission, the RF signal waves radiated from the antennas 6*a*, 6*b*, . . . 6*n* aggregate through constructive and destructive interference to collectively generate a transmit beam having a particular direction. With respect to signal reception, the channel processing circuit 3 generates a receive beam by combining the RF signals received from the antennas 6*a*, 6*b*, . . . 6*n* after amplitude scaling and phase shifting.

Phased array antenna systems are used in a wide variety of applications including, but not limited to, mobile communications, military and defense systems, and/or radar technology.

As shown in FIG. 1, the RF front ends 5*a*, 5*b*, . . . 5*n* each include one or more VGAs 11*a*, 11*b*, . . . 11*n*, which are used to scale the amplitude of RF signals transmitted or received by the antennas 6*a*, 6*b*, . . . 6*n*, respectively. Additionally, the RF front ends 5*a*, 5*b*, 5*n* each include one or more phase shifters 12*a*, 12*b*, . . . 12*n*, respectively, for phase-shifting the RF signals. For example, in certain implementations the phase and amplitude control circuit 9 generates gain control signals for controlling the amount of gain provided by the VGAs 11*a*, 11*b*, . . . 11*n* and phase control signals for controlling the amount of phase shifting provided by the phase shifters 12*a*, 12*b*, . . . 12*n*.

With continuing reference to FIG. 1, in this example the RF front ends 5*a*, 5*b*, . . . 5*n* also include one or more transmit/receive (T/R) switches 13*a*, 13*b*, . . . 13*n*, respectively. The T/R switches 13*a*, 13*b*, . . . 13*n* aid in controlling access of transmit and receive paths to the antennas 6*a*, 6*b*, . . . 6*n*. However, other implementations are possible, such as configurations in with T/R switches are omitted in favor of using other antenna multiplexing structures (for instance, duplexers, diplexers, and/or triplexers) and/or using separate antennas for transmit and receive.

The phased array antenna system 10 operates to generate a transmit beam and/or receive beam including a main lobe pointed in a desired direction of communication. The phased array antenna system 10 realizes increased signal to noise (SNR) ratio in the direction of the main lobe. The transmit and/or receive beam also includes one or more side lobes, which point in different directions than the main lobe and are undesirable.

An accuracy of beam direction of the phased array antenna system 10 is based on a precision in controlling the gain and phases of the RF signals communicated via the antennas 6*a*, 6*b*, . . . 6*n*. For example, when one or more of the RF signals has a large phase error, the beam can be broken and/or pointed in an incorrect direction. Furthermore, the size or magnitude of beam side lobe levels is based on an accuracy in controlling the phases and amplitudes of the RF signals.

Accordingly, it is desirable to tightly control the phase and amplitude of RF signals communicated by the antennas 6*a*, 6*b*, . . . 6*n* to provide robust beamforming operations.

Although the dielectric resonator antennas herein can be used in beamforming communications, the teachings herein are also applicable to other types of electronic systems, including those that operate without beamforming.

Figure 2A:
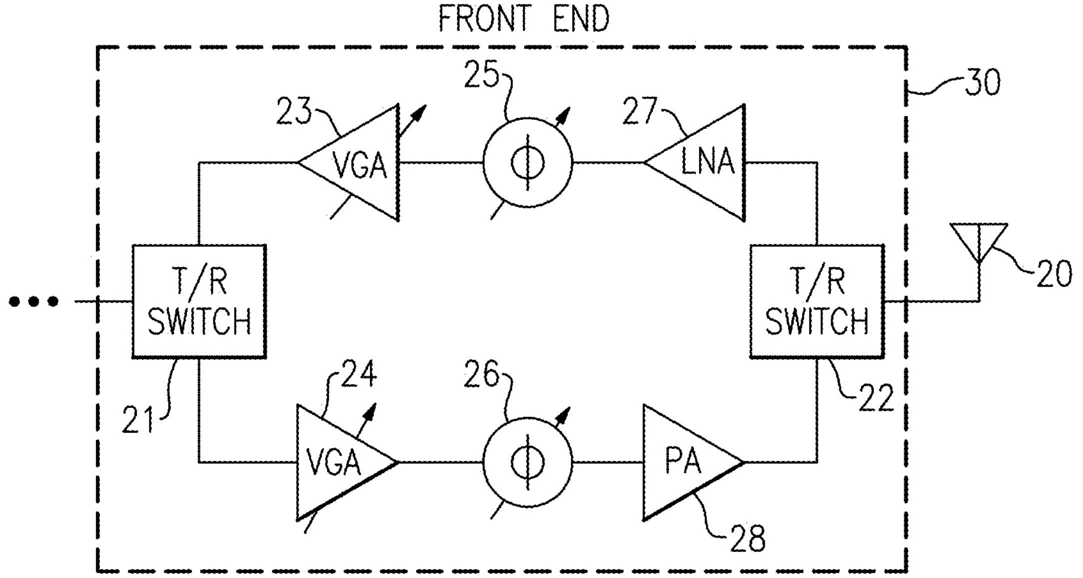
FIG. 2A is a schematic diagram of one embodiment of a front end system.

FIG. 2A is a schematic diagram of one embodiment of a front end system 30. The front end system 30 includes a first transmit/receive (T/R) switch 21, a second transmit/receive switch 22, a receive-path VGA 23, a transmit-path VGA 24, a receive-path controllable phase shifter 25, a transmit-path phase shifter 26, a low noise amplifier (LNA) 27, and a power amplifier (PA) 28. As shown in FIG. 2A, the front end system 30 is depicted as being coupled to an antenna 20. The antenna 20 can correspond to a dielectric resonator antenna implemented in accordance with any of the embodiments herein.

The front end system 30 can be included in a wide variety of RF systems, including, but not limited to, phased array antenna systems, such as the phased array antenna system 10 of FIG. 1. For example, multiple instantiations of the front end system 30 can be used to implement the RF front ends 5*a*, 5*b*, . . . 5*n* of FIG. 1. In certain implementations, one or more instantiations of the front end system 30 are fabricated on a semiconductor die or chip.

As shown in FIG. 2A, the front end system 30 includes the receive-path VGA 23 for controlling an amount of amplification provided to an RF input signal received on the antenna 20, and the transmit-path VGA 24 for controlling an amount of amplification provided to an RF output signal transmitted on the antenna 20. Additionally, the front end system 30 includes the receive-path controllable phase shifter 25 for controlling an amount of phase shift to an RF input signal received on the antenna 20, and the transmit-path controllable phase shifter 26 for controlling an amount of phase shift provided to the RF output signal transmitted on the antenna 20.

The gain control provided by the VGAs and the phase control provided by the phase shifters can serve a wide variety of purposes including, but not limited to, compensating for temperature and/or process variation. Moreover, in beamforming applications, the VGAs and phase shifters can control side-lobe levels of a beam pattern.

Figure 2B:
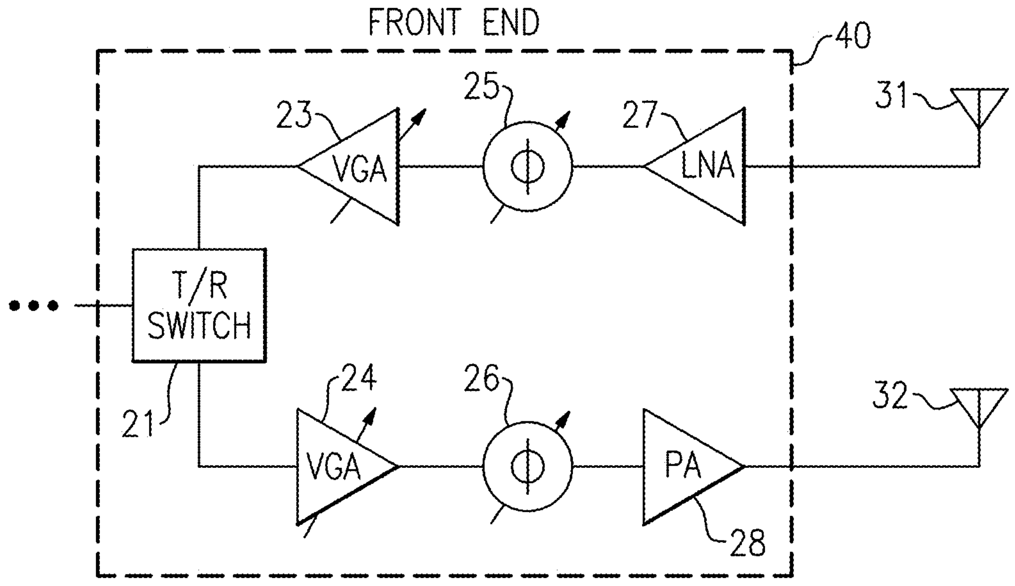
FIG. 2B is a schematic diagram of another embodiment of a front end system.

FIG. 2B is a schematic diagram of another embodiment of a front end system 40. The front end system 40 of FIG. 2B is similar to the front end system 30 of FIG. 2A, except that the front end system 40 omits the second transmit/receive switch 22. As shown in FIG. 2B, the front end system 40 is depicted as being coupled to a receive antenna 31 and to a transmit antenna 32. The receive antenna 31 and/or the transmit antenna 32 can correspond to dielectric resonator antennas implemented in accordance with the teachings herein.

The front end system 40 operates with different antennas for signal transmission and reception. In the illustrated embodiment, the receive-path VGA 23 controls an amount of amplification provided to an RF input signal received on the receive antenna 31, and the transmit-path VGA 24 controls an amount of amplification provided to an RF output signal transmitted on the second antenna 32. Additionally, the receive-path phase shifter 25 controls an amount of phase shift provided to the RF input signal received on the receive antenna 31, and the transmit-path phase shifter 26 controls an amount of phase shift provided to an RF output signal transmitted on the second antenna 32.

Certain RF systems include separate antennas for transmission and reception of signals.

Dielectric Resonator Antennas Mountable on Circuit Boards

Figure 3:
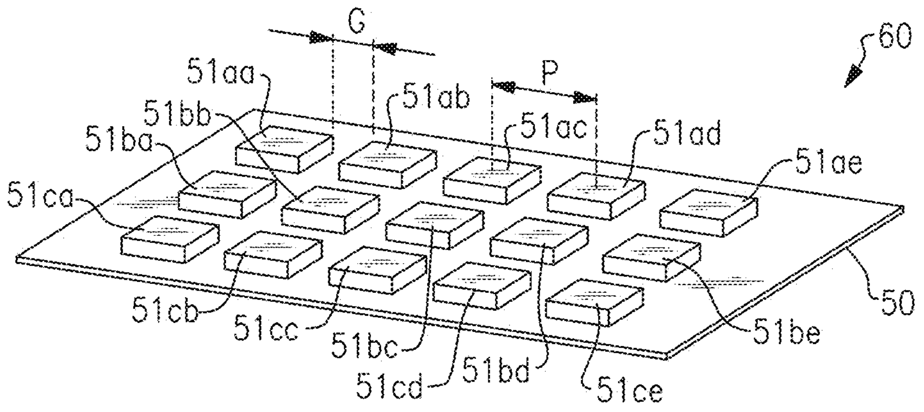
FIG. 3 is a schematic diagram of one embodiment of a circuit board including an array of dielectric resonator antennas.

FIG. 3 is a schematic diagram of one embodiment of a circuit board 50 including an array 60 of dielectric resonator antennas attached thereto.

In the illustrated embodiment, the array 60 of dielectric resonator antennas is arranged in five-by-three (5×3) pattern, and includes dielectric resonator antennas 51*aa*, 51*ab*, 51*ac*, 51*ad*, 51*ae*, 51*ba*, 51*bb*, 51*bc*, 51*bd*, 51*be*, 51*ca*, 51*cb*, 51*cc*, 51*cd*, and 51*ce*. Although an example of a 5×3 array is shown, any array size is possible. Thus, other numbers of dielectric resonator antennas can be included in an array. Furthermore, an array pattern need not be rectangular or uniform.

As shown in FIG. 3, the dielectric resonator antennas of the array 60 are arranged with a pitch P and are laterally separated by an array spacing or gap G. In accordance with the teachings herein, the dielectric resonator antennas correspond to surface mount technology (SMT) components that are mountable (for example, by soldering) to the circuit board 50. In certain implementations, the circuit board 50 corresponds to a multi-layer printed circuit board (PCB) including a stack of patterned conductive layers separated by dielectric.

Although not shown in FIG. 3, front end circuit components, such as beamforming integrated circuits (ICs) can also be attached to the circuit board 50 to aid in forming a highly compact and integrated phased array antenna system.

In applications in which the array 60 operates with a large scan angle, it is desirable for the pitch P of the dielectric resonator antennas to be small. For example, a pitch P of about 2/2 can be desired, where $\lambda_0$ corresponds to a wavelength of the RF signals communicated by the antenna elements of the array 60.

To achieve an array of closely spaced antenna elements, a compact antenna design is desired. For example, for an SMT antenna array, the pitch P can be limited by the array spacing G, which in turn can be constrained by the assembly clearance capability of the assembly house and/or a maximum allowable mutual coupling between adjacent antenna elements.

Furthermore, since bandwidth is also desired to be wide in many applications, it is desirable for the antennas to be of a significant volume.

Apparatus and methods for dielectric resonator antennas are disclosed herein. In certain embodiments, a dielectric resonator antenna includes a dielectric body, one or more signal conductors formed in the dielectric body and configured to handle a radio frequency wave, and one or more signal ports on an outer surface of the dielectric body and connected to the one or more signal conductors. The dielectric resonator antenna is mountable to a circuit board (for instance, to a PCB), with the one or more signal ports serving as an interface between the dielectric resonator antenna and the circuit board. Such an interface can further include one or more ground ports.

By implementing an antenna array using dielectric resonator antennas in accordance with the teachings herein, a compact antenna array can be achieved. For example, the dielectric resonator antennas herein can be arrayed with small pitch P due to the dielectric resonator antennas extending vertically to provide for sufficient array spacing G. The dielectric resonator antennas herein are mountable (for example, solderable) onto a circuit board as SMT components. For instance, the vertically extended profile can provide for about $\lambda_0/2$ pitch while still achieving an inter-element spacing of at least 1.5 mm.

Thus, an Antenna on Board (AoB) problem is solved by using the dielectric resonator antennas herein as wideband antenna elements formed in a compact area to provide room for assembly.

The three-dimensional (3D) construction of the dielectric resonator antennas also provides for additional flexibility in designing a desired antenna response.

Moreover, the dielectric resonator antennas provide wideband frequency operation, for instance, 9% to 25% fractional bandwidth.

Furthermore, the dielectric resonator antennas herein can exhibit high isolation between ports. For example, the dielectric resonator antennas can be implemented with a pair of signal ports (for example, for handling RF signals of different polarizations, such as a horizontally-polarized RF signal and a vertically-polarized RF signal), and the pair of signal ports can be isolated from one another. Such isolation can be enhanced by including selective metallization within the dielectric resonator antenna to reduce port-to-port coupling. The selective metallization can also be used to improve impedance matching.

Including multiple signal ports also enables dual polarization performance. Thus, the dielectric resonator antennas herein are applicable not only to applications with a single signal port, but also to applications in which multiple signal ports are used to accommodate multiple polarizations (for example, horizontal and vertical dual polarizations).

Such signal ports can be formed in a manner that allows arbitrary assembly rotation of the antenna elements. In one example, a dielectric resonator antenna includes a first signal port and a second signal port that are substantially equidistance from a center of the dielectric resonator antenna, and separated from one another by about 90 degrees.

The dielectric resonator antennas herein can be manufactured using a wide variety of processes. In a first example, 3D printing is used to manufacture the dielectric resonator antennas. For instance, high dielectric materials and metals are available using 3D printing processes to aid in forming dielectric resonator antennas. In a second example, injection molding is used to mass produce dielectric resonator antennas with high volume and low cost. In certain implementations, the ports of a dielectric resonator antenna are printed on the exterior surface of the antenna's dielectric body.

Figure 4A:
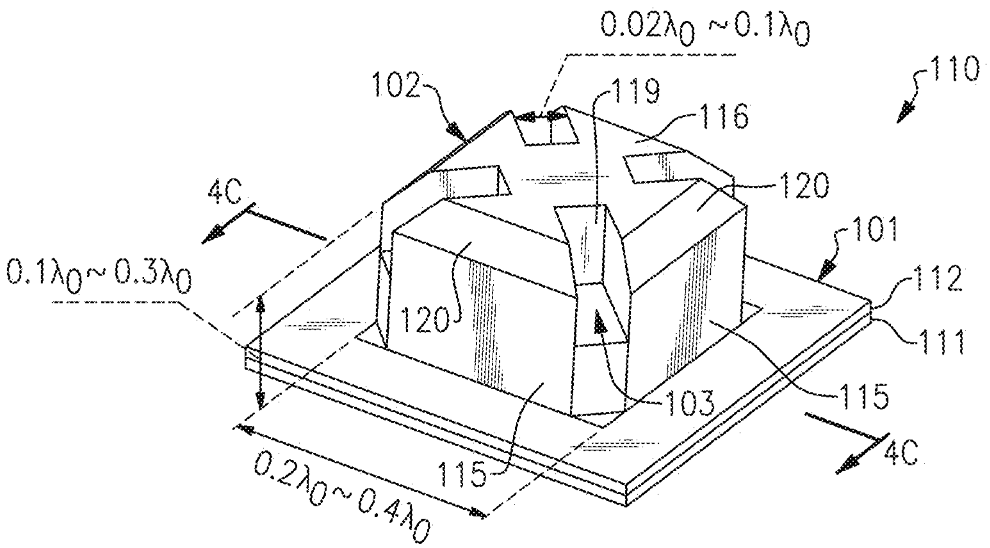
FIG. 4A is a perspective view of a dielectric resonator antenna according to one embodiment.
Figure 4B:
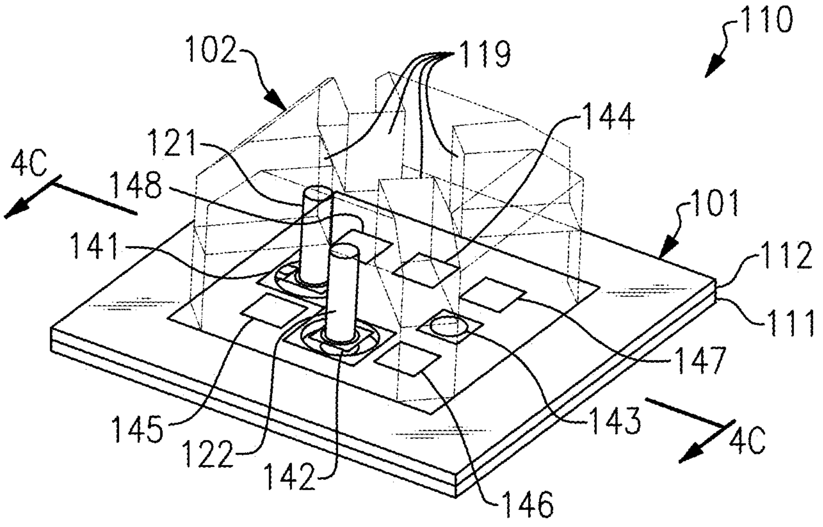
FIG. 4B is a perspective view depicting an internal structure of the dielectric resonator antenna of FIG. 4A.
Figure 4C:
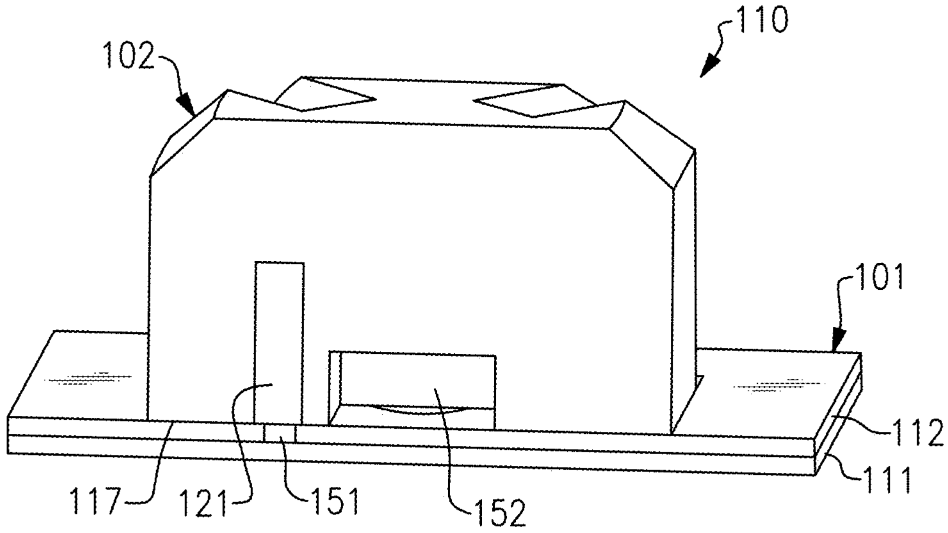
FIG. 4C is a cross sectional view of the dielectric resonator antenna of FIG. 4A taken along the lines 4C-4C.

FIG. 4A is a perspective view of a dielectric resonator antenna 110 according to one embodiment. FIG. 4B is a perspective view depicting an internal structure of the dielectric resonator antenna 110 of FIG. 4A. FIG. 4C is a cross sectional view of the dielectric resonator antenna 110 of FIG. 4A taken along the lines 4C-4C. The dielectric resonator antenna 110 is depicted as being attached to a PCB 101.

With reference to FIGS. 4A-4C, the dielectric resonator antenna 110 includes a dielectric body 102, a first signal conductor 121 in the dielectric body 102, and a second signal conductor 122 in the dielectric body 102.

In the illustrated embodiment, the dielectric body 102 is generally rectangular-shaped, and includes four side surfaces 115, a top surface 116, and a bottom surface 117 for attaching to the PCB 101. Although the illustrated embodiment depicts an implementation in which the dielectric resonator antenna is substantially rectangular when viewed from above, other implementations are possible. For instance, in another embodiment, a dielectric resonator antenna is substantially circular when viewed from above. For example, such a dielectric resonator antenna can have a dielectric body that is cylindrically-shaped.

With continuing reference to FIGS. 4A-4C, sloped top edges 120 are included between the side surfaces 115 and the top surface 116. Additionally, four recesses or grooved corners 103 have been formed where the side surfaces 115 and the top surface 116 meet at corners. Each of the grooved corners 103 includes metallization 119 extending vertically in a directional perpendicular to the top surface 116. Four regions of metallization 119 are included in this embodiment. Thus, the grooved corners 103 are formed with metallized ends for enhanced performance.

The bottom surface 117 of the dielectric body 102 includes various pins or ports 141-148. In this embodiment, the ports include a first signal port 141 connected to the first signal conductor 121, a second signal port 142 connected to the second signal conductor 122, and ground ports 143, 144, 145, 146, 147, and 148. Although one example configuration of ports is shown, other arrangements of ports and/or more or fewer ports are possible. A signal conductor is also referred to herein as a signal probe.

With continuing reference to FIGS. 4A-4C, the signal ports 141/142 and ground ports 143-148 are formed (for example, printed) on the bottom exterior surface 117 of the dielectric body 102 to allow direct soldering to the PCB 101. In the illustrated embodiment, the PCB 101 includes a conductive layer 111 and a non-conductive layer 112 in which conductive region 151 can be formed to connect between the dielectric resonator antenna 110 and the PCB 101.

In the illustrated embodiment, the first signal conductor 121 and the second signal conductor 122 are each formed as cylindrical vias in the dielectric body 102. Such cylindrical vias can be plated. In certain implementations, the signal conductors 121/122 are formed by directly drilling into the dielectric body 102 and metalizing to a desired depth inside the dielectric body 102. By implementing the signal conductors 121/122 in this manner, the antenna shape is precisely controlled to achieve a tight tolerance in mode excitation. In other implementations, the signal conductors 121/122 are formed along with the dielectric body 102 as part of a 3D printing process or otherwise formed in another manner.

As shown in FIG. 4C, an air cavity 152 is formed by way of a recessed region of the dielectric body 102 on the bottom surface 117. Including one or more air cavities serves to enhance antenna performance, for instance, by rearranging the radiating modes of the dielectric resonator antenna 110 to allow for a wideband broadside radiation.

In the illustrated embodiment, the metallization 119 is included as selective metallization that vertically extends in a direction parallel to the signal conductors 121/122. Including the metallization 119 suppresses mutual coupling between the signal ports 141/142.

In certain implementations, the first signal port 141 and the second signal port 142 handle RF signals of different polarizations. For example, the first signal port 141 can serve as a horizontally-polarized signal port, while the second signal port 142 can serve as a vertically-polarized signal port, thereby enabling the dielectric resonator antenna 110 to operate with dual polarization. Although shown as including multiple signal ports, the teachings herein are also applicable to configurations with a single signal port.

The signal ports 141/142 are arranged to allow arbitrary assembly rotation of the dielectric resonator antenna 110. In the illustrated embodiment, the first signal conductor 121/first signal port 141 and the second signal conductor 122/second signal port 142 are substantially equidistance from a center of the dielectric resonator antenna 110, and separated from one another by about 90 degrees when viewed from above.

The dielectric body 102 can be formed using a wide variety of dielectric materials including, but not limited to, alumina or other suitable ceramic oxide. In certain implementations, the dielectric body 102 is a high dielectric constant material having a dielectric constant of at least 7.

With continuing reference to FIGS. 4A-4C, various example dimensions of the dielectric resonator antenna 110 are shown, in which $\lambda_0$ corresponds to the antenna's wavelength.

In the illustrated embodiment, the width along the side surfaces 115 of the dielectric resonator antenna 110 is in the range of $0.2\lambda_0$ to $0.4\lambda_0$. The width of each of the side surfaces 115 can be the same or different. Additionally, a height of the dielectric resonator antenna 100 is in the range of $0.1\lambda_0$ to $0.3\lambda_0$. Furthermore, a width of the grooved corners 103 is in the range of $0.02\lambda_0$ to $0.1\lambda_0$. Furthermore, in certain implementations a height of the signal conductors 121/122 is in the range of $0.05\lambda_0$ to $0.15\lambda_0$. Although example dimensions are shown and described, other values of the dimensions are possible.

Figure 5A:
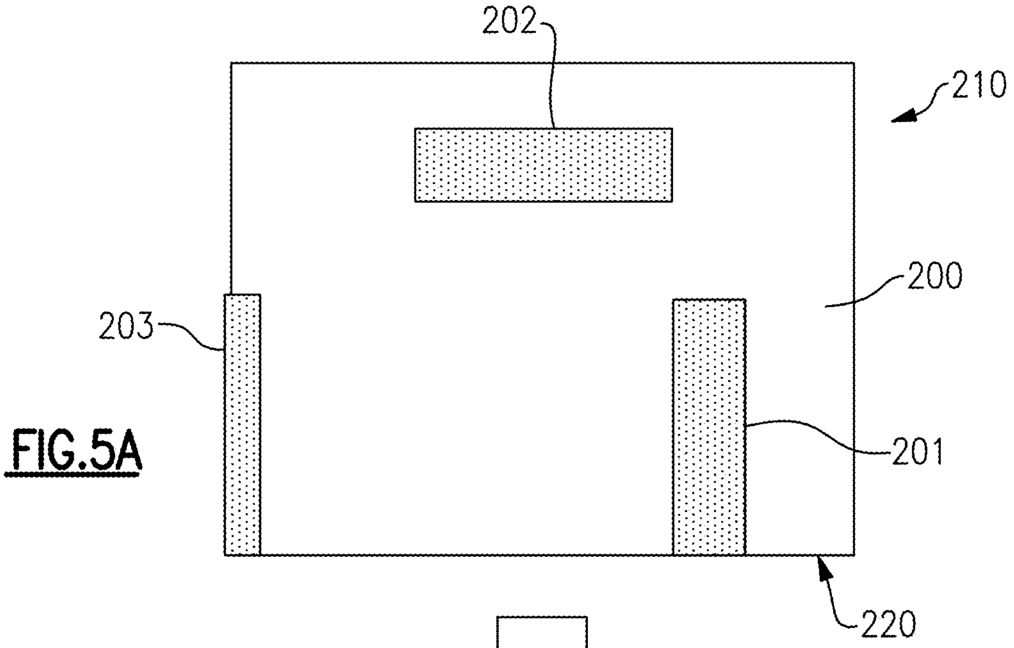
FIG. 5A is a schematic diagram of a cross section of a dielectric resonator antenna according to another embodiment.
Figure 5B:
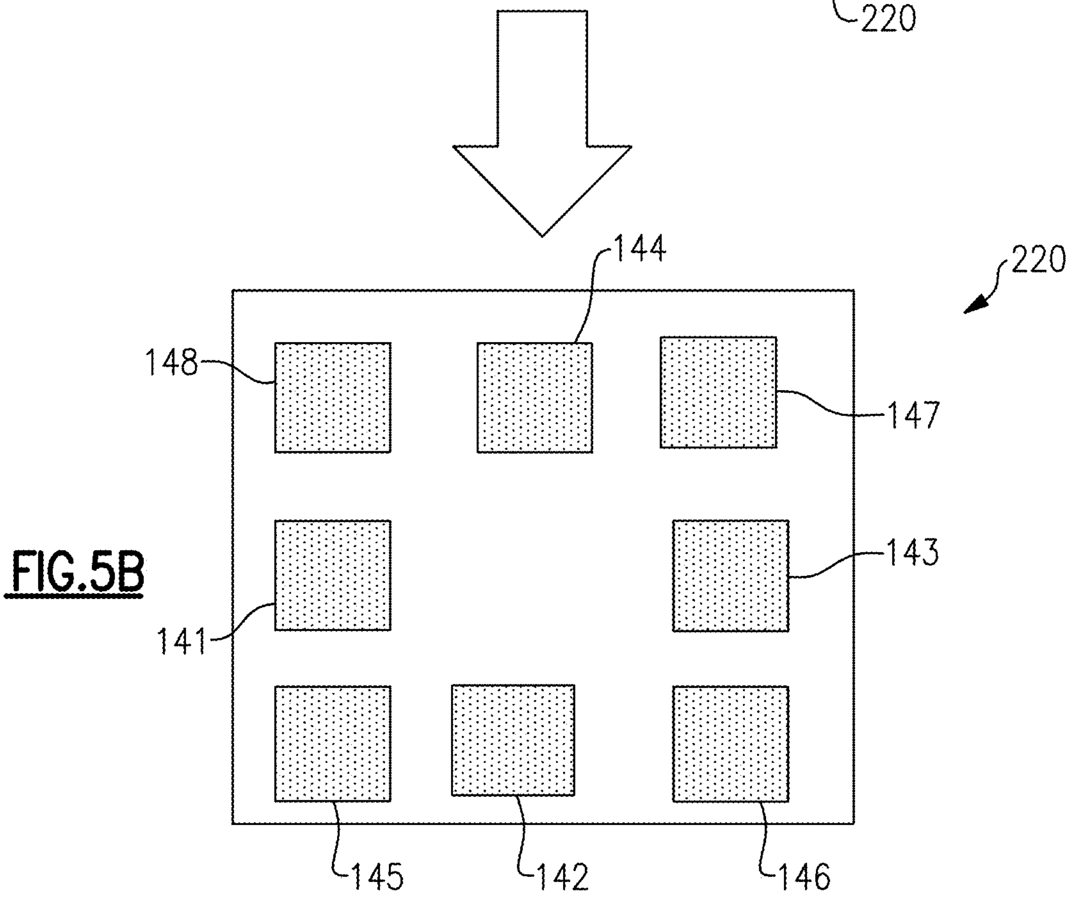
FIG. 5B is a schematic diagram of one embodiment of an interface for the dielectric resonator antenna of FIG. 5A.

FIG. 5A is a schematic diagram of a cross section of a dielectric resonator antenna 210 according to another embodiment. FIG. 5B is a schematic diagram of one embodiment of an interface 220 for the dielectric resonator antenna 210 of FIG. 5A.

With reference to FIGS. 5A and 5B, the dielectric resonator antenna 210 includes a dielectric body 210 in which a signal conductor 201 is formed. In this example, the dielectric resonator antenna 210 also includes side metallization 203 along a side of the dielectric body 200. The side metallization 203 can be electrically connected to a signal port in some implementations. However, other implementations are possible, such as configurations in which the side metallization 203 is grounded or electrically floating. The dielectric resonator antenna 210 also includes face metallization 202, in this embodiment.

In the illustrated embodiment, the dielectric body 200 includes a bottom exterior surface serving as the interface 220 for attaching to a circuit board. The interface 220 includes ports 141-148, in this embodiment. The ports 141-148 can correspond to signal or ground ports, based on the implementation.

Figure 6A:
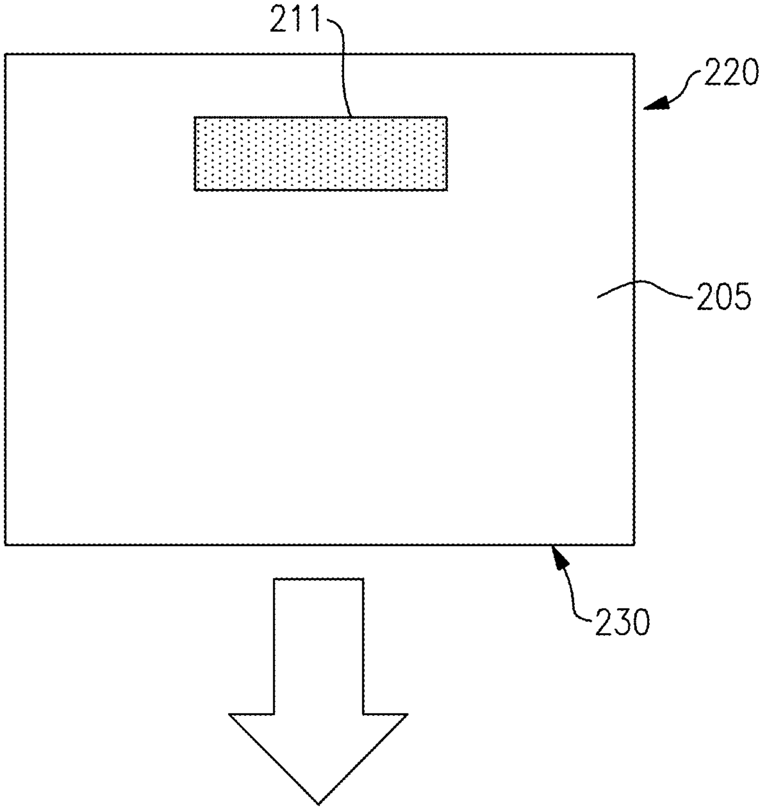
FIG. 6A is a schematic diagram of a cross section of a dielectric resonator antenna according to another embodiment.
Figure 6B:
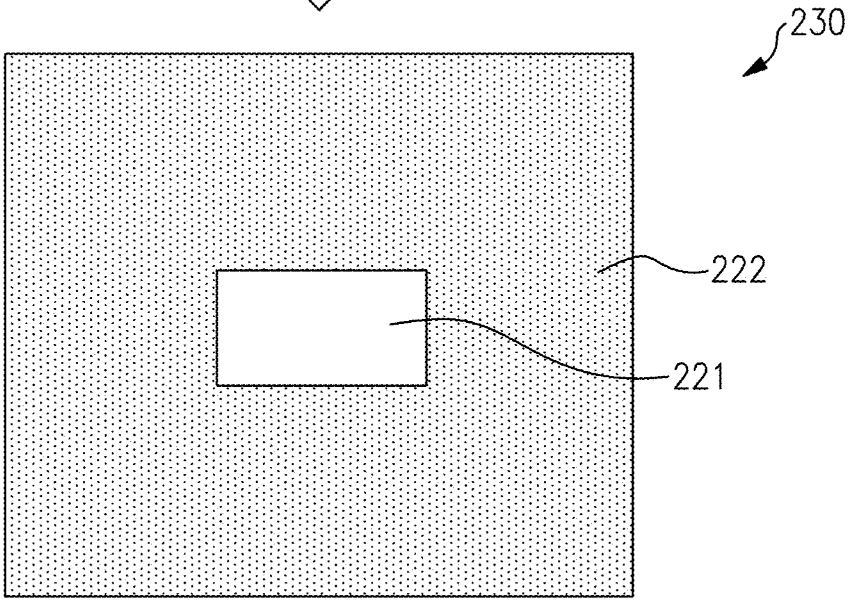
FIG. 6B is a schematic diagram of one embodiment of an interface for the dielectric resonator antenna of FIG. 6A.

FIG. 6A is a schematic diagram of a cross section of a dielectric resonator antenna 220 according to another embodiment. FIG. 6B is a schematic diagram of one embodiment of an interface 230 for the dielectric resonator antenna 220 of FIG. 6A.

With reference to FIGS. 6A and 6B, the dielectric resonator antenna 220 includes a dielectric body 205 in which face metallization 211 is formed. However, in other implementations, the face metallization 211 is omitted.

In the illustrated embodiment, the dielectric body 205 includes a bottom exterior surface for serving as the interface 230 for attaching to a circuit board, either directly or indirectly through a sub-assembly. The interface 230 includes a solderable ground port 222 and an excitation slot opening 221 for excitation of an RF signal.

Figure 7A:
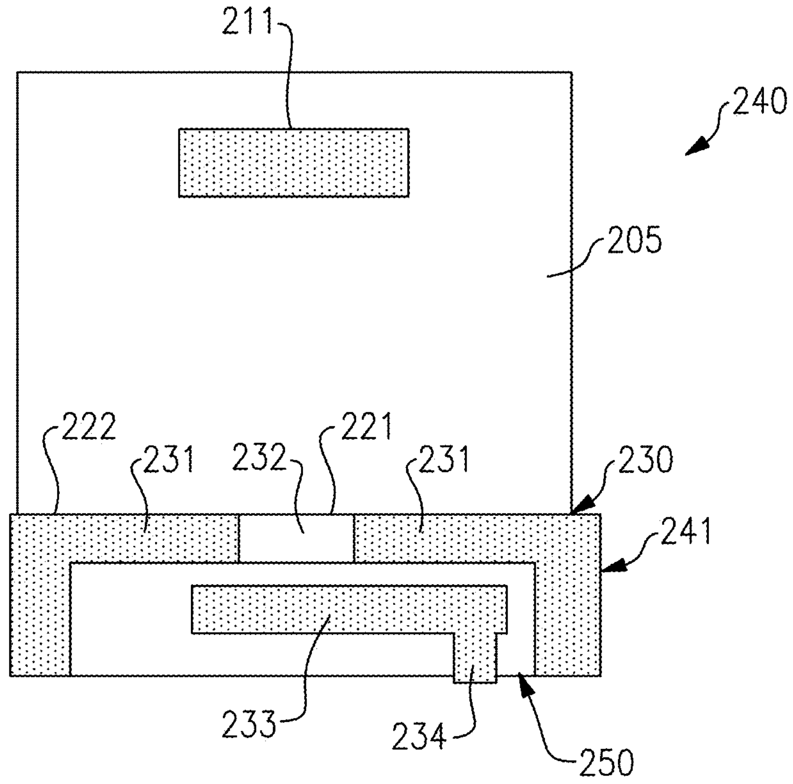
FIG. 7A is a schematic diagram of a cross section of a dielectric resonator antenna according to another embodiment.
Figure 7B:
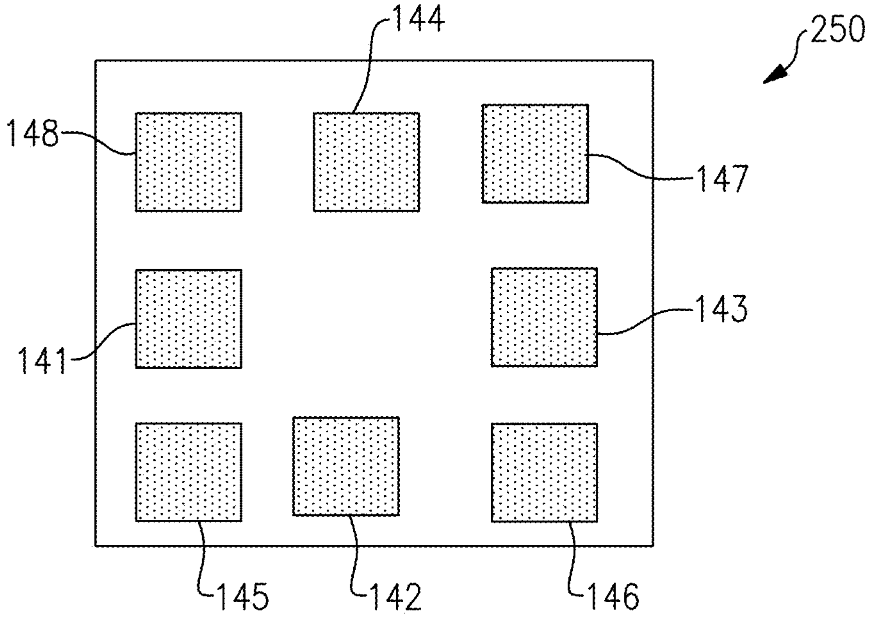
FIG. 7B is a schematic diagram of one embodiment of an interface for the dielectric resonator antenna of FIG. 7A.

FIG. 7A is a schematic diagram of a cross section of a dielectric resonator antenna 240 according to another embodiment. FIG. 7B is a schematic diagram of one embodiment of an interface 250 for the dielectric resonator antenna 240 of FIG. 7A.

With reference to FIGS. 7A and 7B, the dielectric resonator antenna 240 includes a dielectric body 205 in which face metallization 211 is formed. However, in other implementations, the face metallization 211 is omitted. The dielectric resonator antenna 240 also includes a sub-assembly 241 that connects to the dielectric body 205 at the interface 230 of the dielectric body 205. The interface 230 corresponds to a bottom exterior surface of the dielectric body 205 and includes a solderable ground port 222 and an excitation slot opening 221 for excitation of an RF signal. Thus, the exterior top surface of the sub-assembly 241 connects to the exterior bottom surface of the dielectric body 205 at the interface 230.

The sub-assembly 241 includes a grounded conductor 231 that includes an opening 232 aligned with the slot 221. Additionally, the sub-assembly 241 includes a signal feed 233 that extends beneath the opening 232/slot 221. A via 234 is connected to the signal feed 233.

In the illustrated embodiment, the sub-assembly 241 includes a bottom exterior surface that serves as the interface 250 for attaching to a circuit board. The interface 250 includes ports 141-148, in this embodiment. The ports 141-148 can correspond to signal or ground ports, based on the implementation.

The embodiment of FIGS. 7A and 7B corresponds to a dielectric resonator antenna that is made up of multiple pieces. Such pieces can be assembled after selective metallization (building block or LEGO® assembly).

Figure 8A:
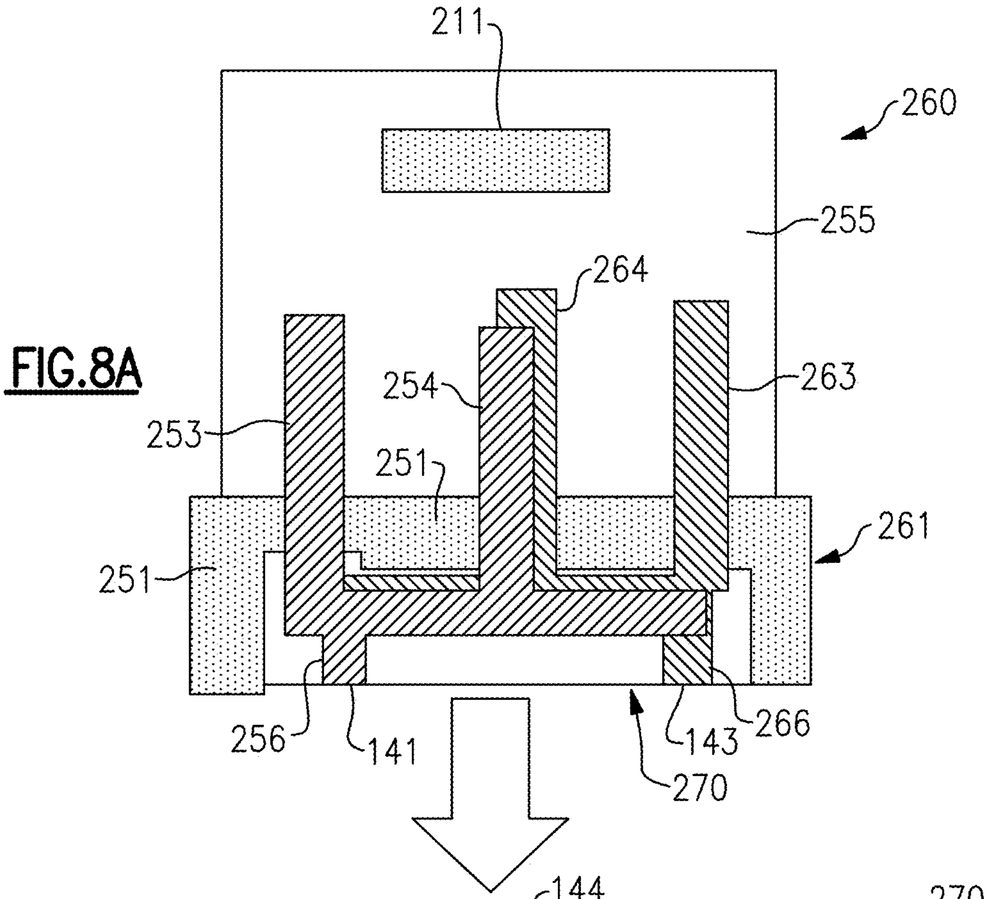
FIG. 8A is a schematic diagram of a cross sectional view of a dielectric resonator antenna according to another embodiment.
Figure 8B:
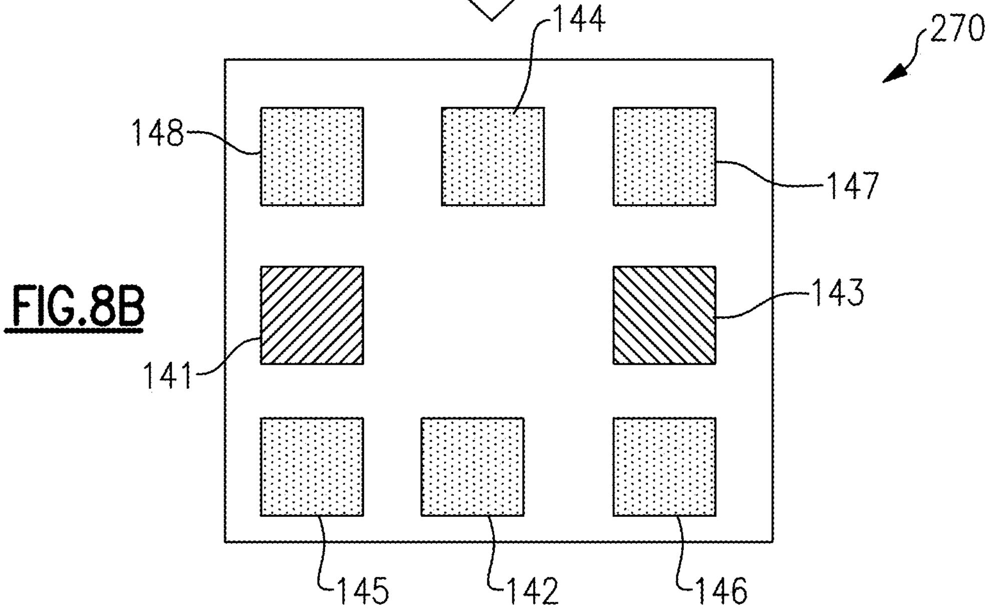
FIG. 8B is a schematic diagram of one embodiment of an interface for the dielectric resonator antenna of FIG. 8A.

FIG. 8A is a schematic diagram of a cross sectional view of a dielectric resonator antenna 260 according to another embodiment. FIG. 8B is a schematic diagram of one embodiment of an interface 270 for the dielectric resonator antenna 260 of FIG. 8A.

With reference to FIGS. 8A and 8B, the dielectric resonator antenna 260 includes a dielectric body 255 in which face metallization 211 is formed. However, in other implementations, the face metallization 211 is omitted. The dielectric resonator antenna 260 also includes a sub-assembly 261 having a top exterior surface that interfaces with a bottom exterior surface of the dielectric body 255.

The sub-assembly 261 includes a grounded conductor 251 that includes openings that allow passage of signal conductors into the dielectric body 255. In this embodiment, the signal conductors include a first signal conductor 253 and a second signal conductor 254 that are connected to a first common signal feed 256 by way of a first conductor. The signal conductors further include a third signal conductor 263 and a fourth signal conductor 264 that are connected to a second common signal feed 266 by way of a second conductor. In the cross sectional view of FIG. 8A, two overlapping cross sections are depicted. One such cross section includes the first signal conductor 253 and the second signal conductor 254 and associated metallization, while another cross section includes the third signal conductor 263 and the fourth signal conductor 264 and associated metallization. The first signal conductor 253 and the second signal conductor 254 are not short-circuited to the third signal conductor 263 and the fourth signal conductor 264, but rather are associated with two different cross-sections of the dielectric resonator antenna 260.

In the illustrated embodiment, a bottom exterior surface of the sub-assembly 261 includes an interface 270 for attaching to a circuit board. The interface 270 includes ports 141-148, in this embodiment. The port 141 is electrically connected to the first common signal feed 256, while the port 143 is electrically connected to the second common signal feed 266, in this embodiment.

The embodiment of FIGS. 8A and 8B corresponds to a dielectric resonator antenna that is made up of multiple pieces. Such pieces can be assembled after selective metallization (LEGO assembly).

Figure 9:
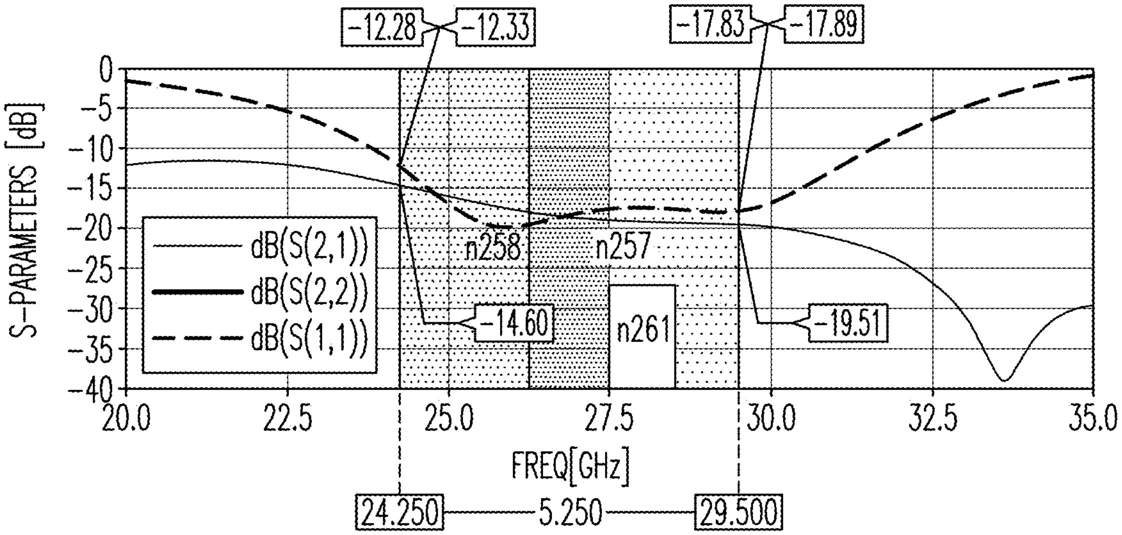
FIG. 9 is a graph of one example of S-parameters versus frequency for a dielectric resonator antenna.
Figure 10:
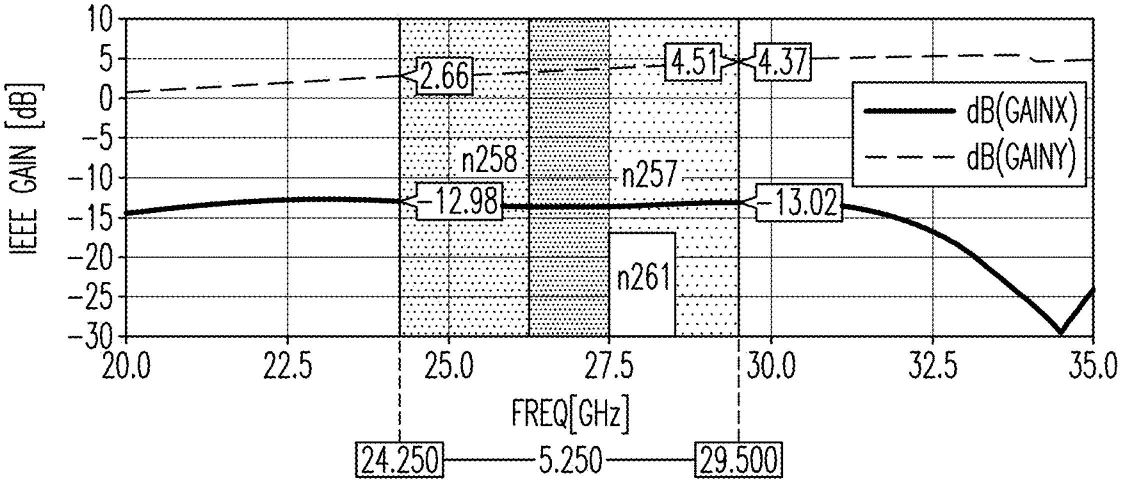
FIG. 10 is a graph of one example of gain versus frequency for a dielectric resonator antenna.

FIG. 9 is a graph of one example of S-parameters versus frequency for a dielectric resonator antenna. FIG. 10 is a graph of one example of gain versus frequency for a dielectric resonator antenna.

The graphs of FIGS. 9 and 10 depict simulation results for one implementation of the dielectric resonator antenna 110 of FIGS. 4A to 4C. In FIG. 9, plots of S21, S22, and S11 are included. The graphs of FIGS. 9 and 10 cover a frequency range that includes 5G frequency bands n257, n258, and n261.

As shown in FIGS. 9 and 10, the dielectric resonator antenna exhibits good reflection coefficient, isolation, and gain across a wide frequency range.

Figure 11A:
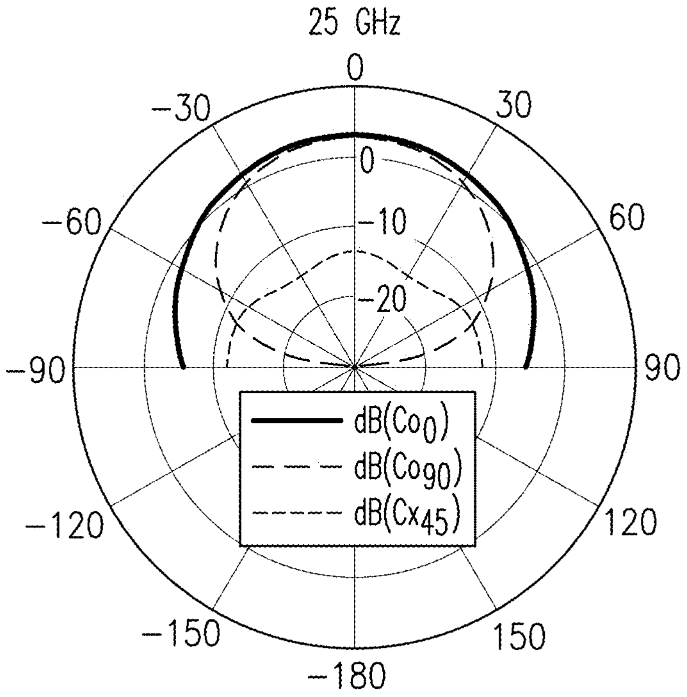
FIG. 11A is a graph of one example of a radiation pattern for a dielectric resonator antenna operating at 25 gigahertz (GHz).
Figure 11B:
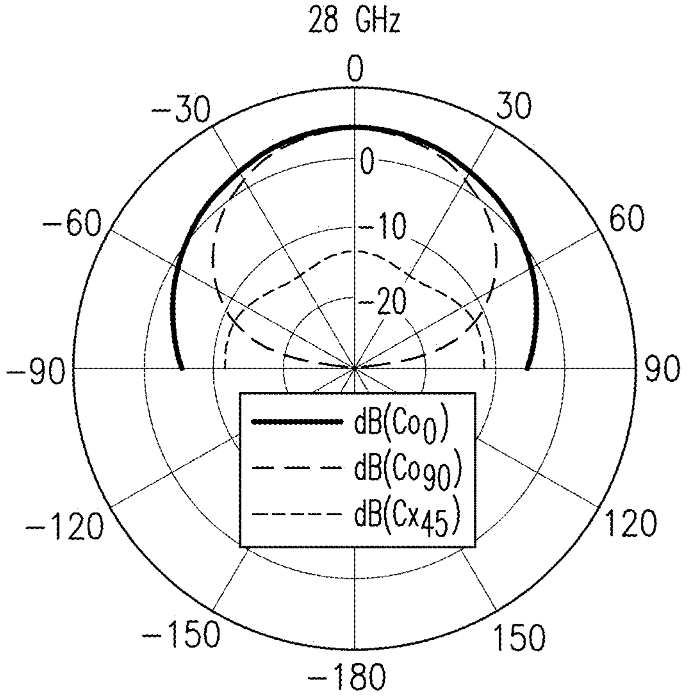
FIG. 11B is a graph of another example of a radiation pattern for a dielectric resonator antenna operating at 28 GHz.

FIG. 11A is a graph of one example of a radiation pattern for a dielectric resonator antenna operating at 25 GHz. FIG. 11B is a graph of another example of a radiation pattern for a dielectric resonator antenna operating at 28 GHz. The radiation pattern graphs of FIGS. 11A and 11B depict simulation results for one implementation of the dielectric resonator antenna 110 of FIGS. 4A to 4C. Plots of co-polarization (Co) and cross polarization (Cx) for various angles are depicted.

As shown in FIGS. 11A and 11B, the dielectric resonator antenna exhibits robust radiation pattern at 25 GHz and 28 GHz. Thus, the dielectric resonator antennas are well-suited for operating in frequency range two (FR2) of 5G, for instance, for 5G frequency bands n257, n258, and/or n261. Although the dielectric resonator antennas disclosed herein can be well-suited for 5G FR2 communications, the dielectric resonator antennas can also be used for communicating RF signals of other frequency bands and/or of other radio access technologies (RATs).

Applications

Devices employing the above described schemes can be implemented into various electronic devices. Examples of electronic devices include, but are not limited to, RF communication systems, consumer electronic products, electronic test equipment, communication infrastructure, etc. For instance, one or more dielectric resonator antennas can be included in a wide range of RF communication systems, including, but not limited to, radar systems, base stations, mobile devices (for instance, smartphones or handsets), phased array antenna systems, laptop computers, tablets, and/or wearable electronics.

The teachings herein are applicable to RF communication systems operating over a wide range of frequencies, including not only RF signals between 100 MHZ and 7 GHZ, but also to higher frequencies, such as those in the X band (about 7 GHZ to 12 GHz), the $K_u$ band (about 12 GHz to 18 GHZ), the K band (about 18 GHz to 27 GHZ), the $K_a$ band (about 27 GHz to 40 GHZ), the V band (about 40 GHz to 75 GHZ), and/or the W band (about 75 GHz to 110 GHz). Accordingly, the teachings herein are applicable to a wide variety of RF communication systems, including microwave communication systems.

The RF signals wirelessly communicated by the dielectric resonator antennas herein can be associated with a variety of communication standards, including, but not limited to, Global System for Mobile Communications (GSM), Enhanced Data Rates for GSM Evolution (EDGE), Code Division Multiple Access (CDMA), wideband CDMA (W-CDMA), 3G, Long Term Evolution (LTE), 4G, and/or 5G, as well as other proprietary and non-proprietary communications standards.

CONCLUSION

The foregoing description may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while the disclosed embodiments are presented in a given arrangement, alternative embodiments may perform similar functionalities with different components and/or circuit topologies, and some elements may be deleted, moved, added, subdivided, combined, and/or modified. Each of these elements may be implemented in a variety of different ways. Any suitable combination of the elements and acts of the various embodiments described above can be combined to provide further embodiments. Accordingly, the scope of the present invention is defined only by reference to the appended claims.

Although the claims presented here are in single dependency format for filing at the USPTO, it is to be understood that any claim may depend on any preceding claim of the same type except when that is clearly not technically feasible.

What is claimed is:

1. A dielectric resonator antenna comprising:

a dielectric body having a bottom surface configured to attach to a circuit board, a top surface opposite the bottom surface, and a plurality of side surfaces including a first side surface and a second side surface, the dielectric body further having a first grooved corner where the top surface meets the first side surface and the second side surface, the first grooved corner including a first portion perpendicular to the top surface and a second portion parallel to the top surface;

a first signal conductor formed in the dielectric body and configured to handle a radio frequency wave; and a first signal port on the bottom surface of the dielectric body and electrically connected to the first signal conductor.

2. The dielectric resonator antenna of claim 1, further comprising a second signal conductor formed in the dielectric body, and a second signal port on the bottom surface of the dielectric body and electrically connected to the second signal conductor, wherein the first signal port is configured to handle a first radio frequency signal of a first polarization, and the second signal port is configured to handle a second radio frequency signal of a second polarization.

3. The dielectric resonator antenna of claim 2, wherein the first signal conductor and the second signal conductor extend parallel to one another in a direction away from the bottom surface.

4. The dielectric resonator antenna of claim 1, further comprising metallization on the first portion of the first grooved corner.

5. The dielectric resonator antenna of claim 1, further comprising an air cavity formed by a recess in the bottom surface.

6. The dielectric resonator antenna of claim 1, further comprising a ground pad on the bottom surface.

7. The dielectric resonator antenna of claim 1, mounted on the circuit board with the first signal port electrically connected to a conductive region of the circuit board.

8. The dielectric resonator antenna of claim 1, formed by three-dimensional (3D) printing.

9. The dielectric resonator antenna of claim 1, formed by injection molding.

10. The dielectric resonator antenna of claim 1, further comprising a sub-assembly attached to the bottom surface of the dielectric body, wherein the first signal port is configured to electrically connect to the circuit board through the sub-assembly.

11. The dielectric resonator antenna of claim 1, wherein the plurality of side surfaces of the dielectric body correspond to four side surfaces, the dielectric body having four grooved corners where the top surface meets the four side surfaces, each of the four grooved corners having metallization extending vertically in a direction perpendicular to the top surface, wherein the metallization does not extend to the bottom surface, and wherein the four grooved corners do not extend to the bottom surface.

12. The dielectric resonator antenna of claim 1, wherein the dielectric body includes a first sloped top edge where the top surface meets the first side surface.

13. The dielectric resonator antenna of claim 1, wherein the first grooved corner does not extend to the bottom surface.

14. The dielectric resonator antenna of claim 1, wherein the first portion and the second portion are rectangularly-shaped surfaces of the first grooved corner, the first grooved corner further including a first side surface perpendicular to both the first portion and the second portion, and a second side surface opposite the first side surface and perpendicular to both the first portion and the second portion, the dielectric resonator antenna further comprising metallization on the first portion of the first grooved corner.

15. An electronic system comprising:

a circuit board; and a first dielectric resonator antenna comprising:

a dielectric body having a bottom surface attached to the circuit board, a top surface opposite the bottom surface, and a plurality of side surfaces including a first side surface and a second side surface, the dielectric body further having a first grooved corner where the top surface meets the first side surface and the second side surface, the first grooved corner including a first portion perpendicular to the top surface and a second portion parallel to the top surface;

a first signal conductor formed in the dielectric body and configured to handle a radio frequency wave; and a first signal port on the bottom surface of the dielectric body and electrically connected to the first signal conductor.

16. The electronic system of claim 15, wherein the first dielectric resonator antenna further comprises a second signal conductor formed in the dielectric body, a second signal port on the bottom surface of the dielectric body and electrically connected to the second signal conductor, and at least one ground pad on the bottom surface.

17. The electronic system of claim 15, further comprising metallization on the first portion of the first grooved corner.

18. The electronic system of claim 15, further comprising an air cavity formed by a recess in the bottom surface.

19. A dielectric resonator antenna comprising:

a dielectric body having a bottom surface configured to attach to a circuit board, a top surface opposite the bottom surface, and a plurality of side surfaces including a first side surface and a second side surface, the dielectric body further having a first grooved corner where the top surface meets the first side surface and the second side surface, the first grooved corner including a first portion perpendicular to the top surface and a second portion parallel to the top surface;

a ground pad formed on the bottom surface; and an excitation slot opening in the ground pad and configured to handle a radio frequency wave.

20. The dielectric resonator antenna of claim 19, further comprising a sub-assembly attached to the bottom surface of the dielectric body, wherein the sub-assembly comprises an excitation conductor positioned beneath the excitation slot opening.

* * * * *